(12) United States Patent
Carter (10) Patent No.: US 6,621,450 B1
(45) Date of Patent: Sep. 16, 2003

(54) METHOD OF SELECTING A PULSE REPETITION FREQUENCY TO DETECT, TRACK OR SEARCH FOR A TARGET

(75) Inventor: Bradford E. Carter, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/193,073

(22) Filed: Jul. 12, 2002

(51) Int. Cl.[7] .......................... G01S 13/00; G01S 13/08
(52) U.S. Cl. ..................... 342/82; 342/137; 342/159
(58) Field of Search ..................... 342/82, 104, 134, 342/137, 159, 175, 202

(56) References Cited

U.S. PATENT DOCUMENTS

| | | | |
|---|---|---|---|
| 3,758,856 A | 9/1973 | Fromm | |
| 3,787,851 A | 1/1974 | Hughes | |
| 3,858,208 A | 12/1974 | Parke et al. | |
| 4,049,953 A | 9/1977 | Evans, Jr. | |
| 4,057,800 A | 11/1977 | Ganz | |
| 4,106,019 A | 8/1978 | Alexander et al. | |
| 4,143,373 A * | 3/1979 | Chernick | 342/88 |
| 4,642,641 A | 2/1987 | Campbell | |
| 4,730,189 A | 3/1988 | Siegel et al. | |
| 4,954,830 A | 9/1990 | Krikorian et al. | |
| 5,057,845 A | 10/1991 | Gellekink | |
| 5,594,451 A | 1/1997 | Krikorian et al. | |
| 5,870,054 A | 2/1999 | Lewis | |
| 6,049,302 A | 4/2000 | Hinckley, Jr. | |
| 6,064,331 A | 5/2000 | Avila et al. | |
| 6,255,985 B1 * | 7/2001 | Towner et al. | 342/165 |
| 6,480,142 B1 * | 11/2002 | Rubin | 342/26 |

FOREIGN PATENT DOCUMENTS

JP          04032790 A   *   2/1992   .......... G01S/13/66

* cited by examiner

*Primary Examiner*—Thomas H. Tarcza
*Assistant Examiner*—Brian Andrea
(74) *Attorney, Agent, or Firm*—Burns, Doane, Swecker & Mathis, LLP (57) ABSTRACT

A method for selecting a pulse repetition frequency to detect, track or search for a target that includes identifying a first feature representative interval of each pulse repetition frequency within a set of pulse repetition frequencies, choosing a selected pulse repetition frequency from the set of pulse repetition frequencies based on cost assigned to each pulse repetition frequency, wherein the cost assigned to a first pulse repetition frequency is at least based on a first cost function of a first position of a first target feature in relation to a first feature assessment interval of the first pulse repetition frequency, and emitting pulsed energy from the emitter using the selected pulse repetition frequency.

20 Claims, 7 Drawing Sheets

METHOD OF SELECTING A PULSE REPETITION FREQUENCY TO DETECT, TRACK OR SEARCH FOR A TARGET

BACKGROUND

FIELD OF THE INVENTION

The present invention relates to a pulse radar system, and in particular, to a method for selecting a pulse repetition frequency of a pulse radar system to detect, track or search for a target.

BACKGROUND INFORMATION

Pulse radar systems detect a target by transmitting a signal and then receiving a return signal reflected back from the target. The target information that may be measured by a radar system includes, for example, the distance and velocity of target objects. The distance of the target is the range of the target from the radar system and the velocity of the target as the speed at which a target is moving relative to the radar system. A sequence of pulses is transmitted from pulse radar systems at a frequency referred to as a Pulse Repetition Frequency ("PRF"). A PRF for a pulse radar system can be chosen from a set of Pulse Repetition Frequencies ("PRFs") that the pulse radar system is capable of generating. The number of PRFs or number of types (e.g., low, medium or high) of PRFs in a set are based upon the system requirements and hardware constraints of a pulse radar system.

Pulse radar systems inherently have internal clutter or interference that can obscure or prevent reception of a return signal in either or both the frequency domain and the time domain. For example, pulse radar systems transmit a stream of pulses and receive return signals in a receiving period in between the transmissions of the pulses. The return signal needs to be received in the receiving period. Otherwise, the return signal from the target will not be received and the distance of the target can not be ascertained. In addition, the return signal will also have a Doppler frequency with a spectral line that needs to be between the main carrier frequency and the PRF of the pulse radar system. Otherwise, the return signal will be obscured by the main carrier frequency or the pulse frequency of the pulse radar system. The time domain and frequency domain responses of a return signal can change because the position and velocity of the target can change.

The reception of a return signal from a target can be obscured or masked by external clutter, such as ground clutter, interference from another signal source (e.g., signal from another radar), or a jammer. For example, if the ambiguous range of the clutter is approximately the same as the ambiguous range of the target for a given PRF, then the return signal will be obscured or masked in the time domain. Similarly, if the ambiguous Doppler frequency of the return signal is approximately the same as the ambiguous Doppler frequency of the return, then the return signal will be masked or obscured in the time domain.

SUMMARY OF THE INVENTION

A pulse radar system used to detect, track or search for a target has to dynamically change the PRF to avoid clutter that obscures reception of target features (i.e., target velocity and target distance). Different PRFs in a set of PRFs result in different relative locations within their ambiguity intervals for target and clutter signals. Therefore, a method of selecting a PRF based on cost assigned to each PRF for receiving at least one given target feature is desirable.

Exemplary embodiments of the present invention are directed to a method for selecting a pulse repetition frequency to detect or search for a target including identifying a first feature representative interval of each pulse repetition frequency within a set of pulse repetition frequencies; choosing a selected pulse repetition frequency from the set of pulse repetition frequencies based on cost assigned to each pulse repetition frequency, wherein the cost assigned to a first pulse repetition frequency is at least based on a first cost function of a first position of a first target feature in relation to a first feature assessment interval of the first pulse repetition frequency; and emitting pulsed energy from the emitter using the selected pulse repetition frequency.

Exemplary embodiments of the present invention are also directed to a method for selecting a pulse repetition frequency to detect, track or search for a target including identifying distance and velocity representative intervals of each pulse repetition frequency within a set of pulse repetition frequencies, choosing a selected pulse repetition frequency from the set of pulse repetition frequencies based on cost assigned to a each pulse repetition frequency, wherein the cost assigned to the first pulse repetition frequency is at least based on a first cost function of a first position of a target distance in relation to a distance assessment interval of the first pulse repetition frequency and a second cost function of a second position of a target velocity in relation to a velocity assessment interval of the first pulse repetition frequency, and emitting pulsed energy from the emitter using the selected pulse repetition frequency.

BRIEF DESCRIPTION OF THE DRAWINGS

Other objects and advantages of the present invention will become apparent to those skilled in the art upon reading the following detailed description of exemplary embodiments, in conjunction with the drawings of the exemplary embodiments, wherein.

DETAILED DESCRIPTION

Figure 1A:
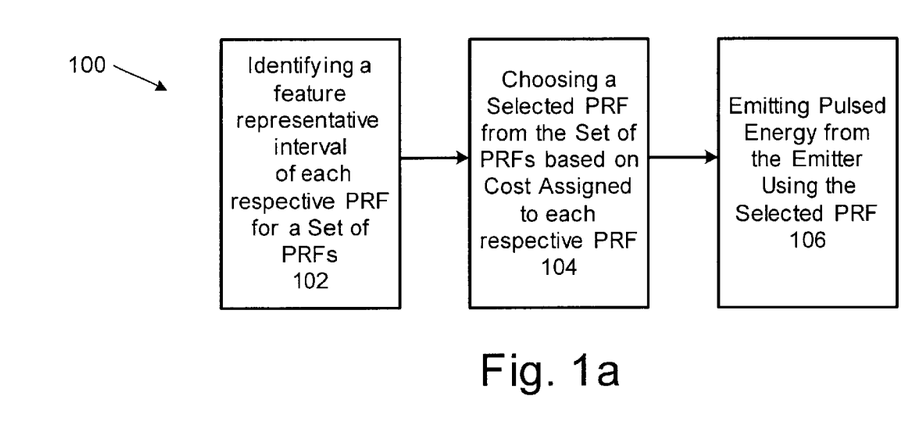
FIG. 1a is a block diagram of an exemplary embodiment of the present invention.

FIG. 1a is a block diagram of an exemplary embodiment 100 that represents a method for selecting a pulse repetition frequency to detect or search for a target. The method, as shown in FIG. 1a, includes the step of identifying a feature representative interval of each pulse repetition frequency within a set of pulse repetition frequencies 102. A feature representative interval of each PRF is one of: a distance representative interval, representing a real or ambiguous range interval in which the target distance will appear, converted from the time domain of the respective PRF; or a velocity representative interval, representing a real or ambiguous Doppler frequency interval in which the target velocity will appear, converted from the frequency domain of the respective (e.g. the first) PRF. For example, an interval of the frequency domain of each PRF, if the target feature of interest is velocity, can be converted to a velocity representative interval Vri(i) for each of the PRFs in a set, or subset, of two or more PRFs. Another example is that an interval of the time domain of each PRF, if the target feature of interest is distance, would be converted to a distance representative interval Dri(i) for each of the respective PRFs in a set of PRFs. Feature representative intervals of each PRF contain internal clutter features. In addition, feature representative intervals of each PRF can also contain representations of a target feature and/or external clutter features that are actual or ambiguous.

As shown in the exemplary embodiment 100 of FIG. 1a, the method includes the step of choosing a selected PRF from the set of PRFs based on cost assigned to each PRF 104. The cost assigned to a PRF is at least based on a first cost function of a first position of a first target feature in relation to a first feature assessment interval of the PRF. The cost can be assigned to each PRF such that a selected PRF is chosen that places a target feature closest to the center of the non-obscured region between internal clutters of the feature representative interval of the selected PRF. Thus, a non-obscured region between internal clutters of a feature representative interval of a PRF can be the feature assessment interval for the PRF.

A cost assignment based on a non-obscured region between internal clutters of a feature representative interval can be used to reduce the number of times that a pulse radar system needs to change PRFs because a PRF can be selected on the basis of having the widest latitude to search for, detect or track the target within the non-obscured region of the PRF's feature representative interval. In addition or in the alternative, if external clutter features are known and/or can be estimated, cost can be assigned to each PRF on the basis of avoiding external clutter features such as altitude velocity, altitude distance, interference velocity and an interference distance. Thus, a band or range of an external clutter feature of a PRF can be a feature assessment interval for the PRF. In the alternative, cost can be assigned so that a PRF is chosen that places a target feature closest to the center of the widest non-obscured feature interval within the feature representative interval of the PRF. Thus, a non-obscured feature interval of a PRF can be the feature assessment interval for a PRF. A cost assignment based on non-obscured feature interval can reduce the number of times that PRFs need to be changed because each selected PRF can be selected on the basis of having the widest latitude between external clutter and/or internal features to search for, track or detect a target.

Figure 1B:
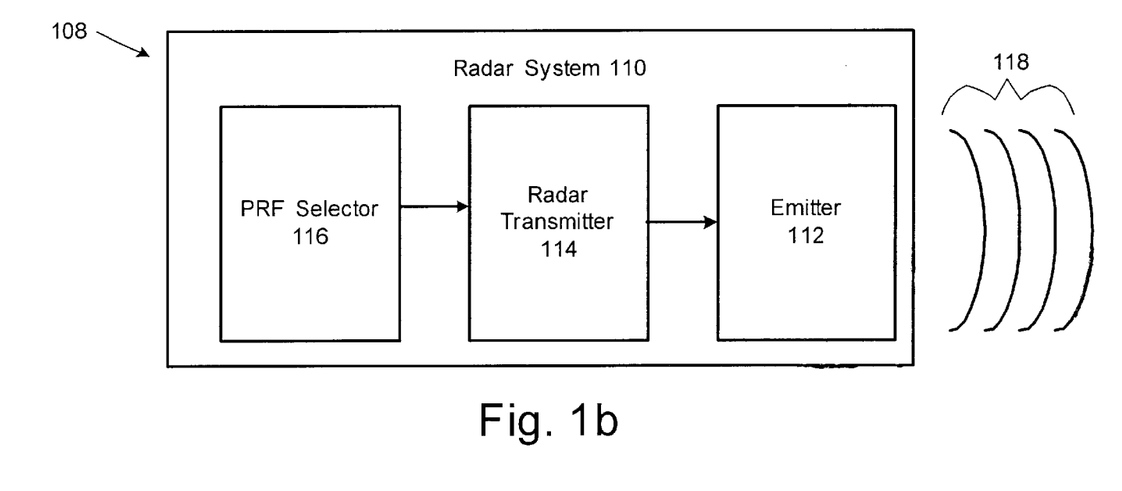
FIG. 1b is an exemplary embodiment of a system in accordance with the present invention.

Another step of the exemplary embodiment 100 in FIG. 1a is to emit pulsed energy from the emitter using the selected PRF 106. An exemplary embodiment 108 of a radar system for choosing a selected PRF based on cost assigned to each PRF is represented in FIG. 1b as a radar system 110 that includes an emitter 112, a radar transmitter 114 and a PRF selector 116. The emitter 112 emits pulsed energy 118. The radar transmitter 114 is connected to the emitter 112 and a PRF selector 116. As shown in the exemplary embodiment 108 of FIG. 1b, the PRF selector 116 provides the radar transmitter 114 with the information of which PRF is selected and then the radar transmitter 114 provides the selected PRF to the emitter 112 for emission.

Figure 2:
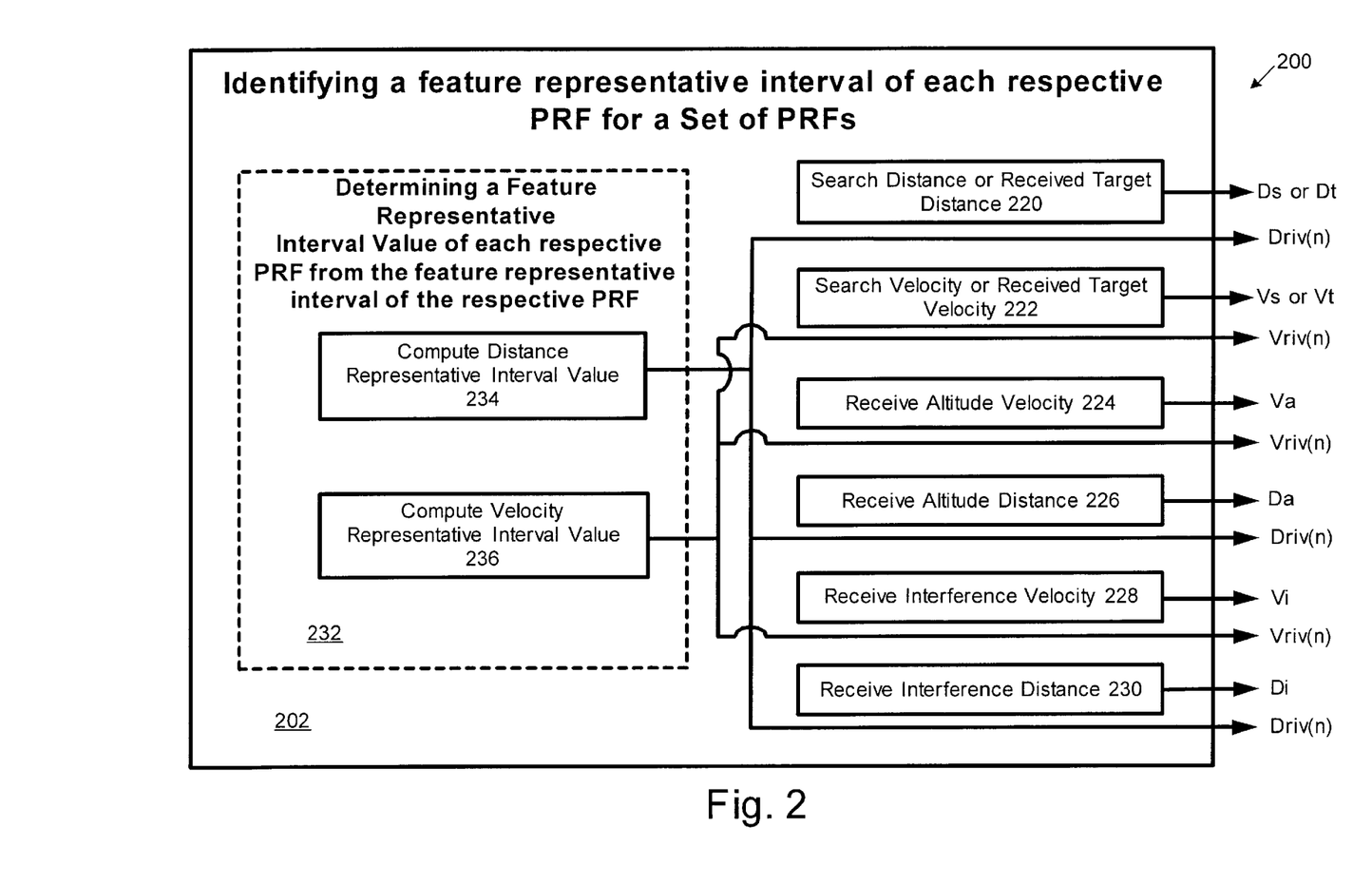
FIG. 2 is a block diagram of exemplary embodiments to identify a feature representative interval of each PRF within a set of PRFs in accordance with the present invention.

FIG. 2 is a block diagram of exemplary embodiments 200 to identify feature representative intervals of each PRF within a set of PRFs 202. As shown in the exemplary embodiments 200 of FIG. 2, identifying a feature representative interval of each PRF within a set of PRFs can include receiving target features (i.e., target distance Dt 220 or target velocity Dv 222) or search features (i.e., search distance Ds 220 or search velocity Vs 222). The received target features 220/222 can be from a previous emission of the radar system, another type of radar system, another pulse radar system, other detection systems (i.e, visual or infrared), positioning systems or combinations thereof. However, receiving target features for tracking or detecting a target is not necessarily a part of identifying feature representative intervals since a search pattern having preselected regiments of scans at predetermined distances and velocities can also be used with the present invention.

As shown in the exemplary embodiments 200 of FIG. 2, identifying feature representative intervals of each PRF within a set of PRFs can include receiving external clutter features, such as altitude velocity Va 224, altitude distance Da 226, interference velocity Vi 228 and interference distance Di 230. The external clutter features 224–230 can be received from a previous emission of a PRF from the radar system, another type of radar system (i.e., long wave), another pulse radar system, other detection systems (i.e, visual or infrared) or combinations thereof. However, receiving external clutter features is not necessarily a part of identifying feature representative intervals since external clutter features may not exist or may be unknown.

Identifying a feature representative interval of each PRF for a set of PRFs, as shown in the exemplary embodiment 200 of FIG. 2, includes determining a feature representative interval value of each PRF from the feature representative interval of each PRF 232. For example, if a feature representative interval is a distance representative interval of each PRF, then a distance representative interval value Driv(n) can be computed for the nth respective PRF 234. In the alternative, if the feature representative interval is a velocity representative interval of a respective PRF, then a velocity representative interval value Vriv(n) can be computed for the nth respective PRF 236. As shown in the exemplary embodiments 200 of FIG. 2, both the velocity representative interval value Vriv(n) and distance representative interval value Driv(n) can be respectively computed for both the velocity and distance representative intervals of each PRF if both features of distance and velocity are received and/or the subject of a search.

Figure 3A:
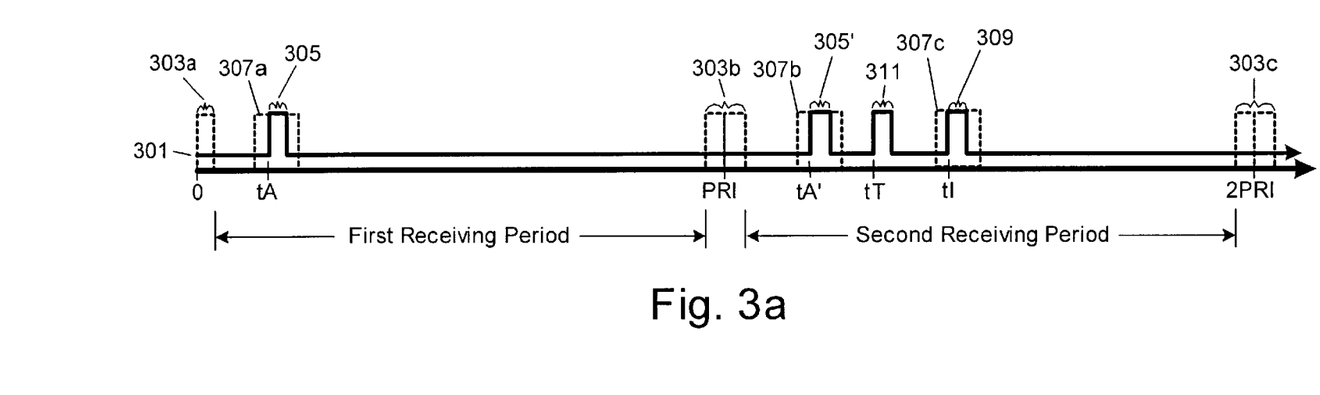
FIGS. 3a and 3b respectively show the time domain and frequency domain response of an estimated return signal resulting from an exemplary PRF.
Figure 3B:
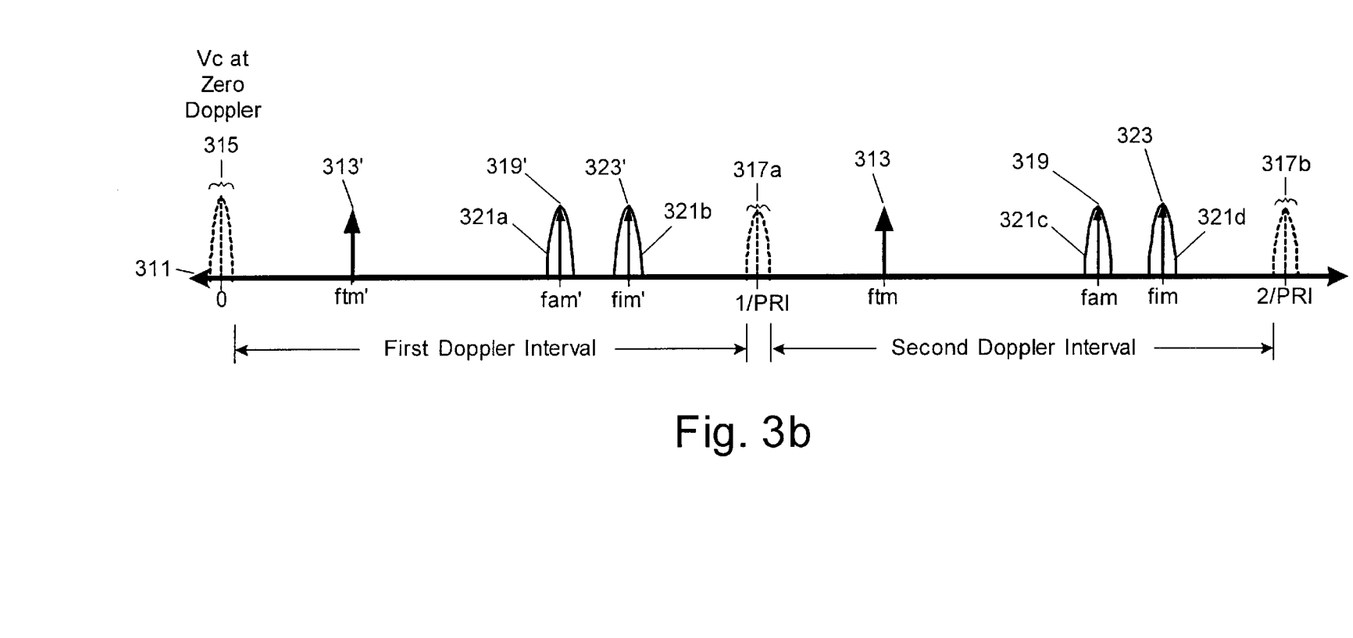

To further explain identifying a feature representative interval of each PRF, an example of an estimated return signal having features based on received features from another radar system will be described in conjunction with an exemplary (e.g. first) PRF from a set of nPRFs. FIGS. 3a and 3b respectively show the estimated time domain response 301 and estimated frequency domain response 311 of the estimated return signal that would result from the exemplary PRF if the exemplary PRF were to be emitted.

The estimated time domain response, as shown in FIG. 3a, has a first receiving period that is within a first interval PRI between a first pulse width clutter 303a and a second pulse width clutter 303b. The second receiving period is within a second interval from PRI to 2PRI between the second pulse width clutters 303b and the third pulse width clutter 303c. The transmission of the exemplary PRF inherently creates pulse width clutters 303a–303c in that the pulse width clutters 303a–303c result from transmission of the exemplary PRF. The first receiving period contains an altitude distance clutter 305 at tA along with a pulse resolution width 307a that a target distance signal should not be within to prevent clutter due to altitude distance.

As also shown in FIG. 3a, the second receiving period of the time domain response of the exemplary PRF also has a representation of an altitude distance clutter 305', at tA' along with the pulse resolution width 307b that the target distance signal or a representation of a target distance signal should not be within to prevent clutter due to altitude distance. Further, the second receiving period of the exemplary PRF time domain response also shows the interference distance clutter 309 at tI along with the pulse resolution width 307c that the target distance signal or a representation of a target distance signal should not be within to prevent clutter due to interference distance. Furthermore, the second receiving period contains the target distance signal 311 at tT.

The estimated frequency domain response is shown in FIG. 3b after a process of motion compensation to move the mainlobe clutter Vc to the zero Doppler position. The process of motion compensation is not required for PRF selection but is done for convenience in calculations in airborne or other moving radar systems. As shown in FIG. 3b, a first Doppler interval is between the mainlobe clutter 315 and the first pulse clutter 317a. The transmission of the exemplary PRF inherently creates the mainlobe clutter 315 and estimated pulse clutters 317a and 317b. The first Doppler interval has a representation of an altitude velocity clutter 319' at fam' along with the frequency resolution width 321a that the target velocity signal or a representation of a target velocity signal should not be within to prevent clutter due to altitude velocity. The first Doppler interval period has a representation of an estimated interference velocity clutter 323' at fim' along with the frequency resolution width 321b that the target velocity signal or a representation of a target velocity signal should not be within to prevent clutter due to interference velocity. The first Doppler interval also has a representation of a target velocity signal 313' at ftm'.

As shown in FIG. 3b, a second Doppler interval is within a second interval from 1/PRI to 2/PRI between the first pulse clutter 317a and a second pulse clutter 317b. The second Doppler interval has an altitude velocity clutter 319 at fam along with a frequency resolution width 321c that the target velocity signal or a representation of a target velocity signal should not be within to prevent clutter due to altitude velocity. Further, the second Doppler interval of the exemplary PRF frequency domain response also shows the interference velocity clutter 323 at fim along with the frequency resolution width 321d that the target velocity signal or a representation of a target velocity signal should not be within to prevent clutter due to interference velocity. Furthermore, the second Doppler interval contains a target velocity signal 313 at ftm.

Figure 4:
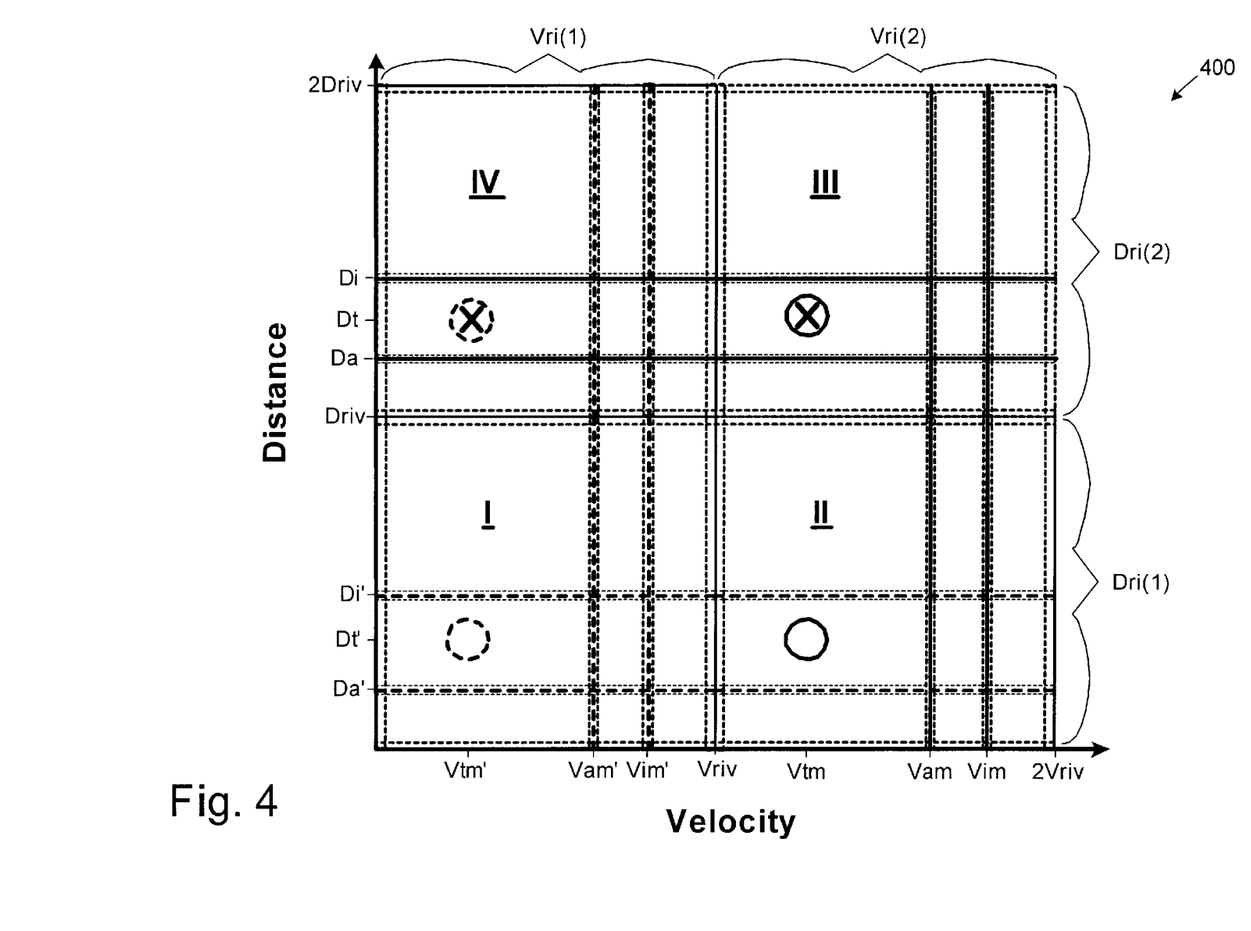
FIG. 4 is an exemplary graphical representation of the estimated return signal from the exemplary PRF, as represented in FIGS. 3a and 3b, with the time domain converted to distance on the vertical axis and the frequency domain converted to velocity on the horizontal axis.

FIG. 4 is an exemplary graphical representation 400 of the estimated return signal of the exemplary PRF shown in FIGS. 3a and 3b in feature representative intervals. The time delay td of an estimated return signal is converted to a distance D on the vertical axis with the following conversion formula:

$$D=(c*td)/2$$

where c=speed of light and
td=time delay from the time domain of the return signal The Doppler frequency of the estimated return signal ise converted to a velocity V on the horizontal axis with the following conversion formula:

$$Vri(i)=(c*fd)/(fc*2)$$

where c=speed of light,
fd=Doppler frequency from the frequency domain of the return signal and
fc=frequency of the carrier signal The distance representative interval value Driv for the exemplary PRF (i.e., the length of the distance representative interval in distance) is computed with the following relationship:

$$Driv=c/(2*PRF)$$

where c=speed of light

The velocity representative interval value Vriv for the exemplary PRF (the length of the velocity representative interval in velocity) is computed with the following relationship:

$$Vriv=(c*PRF)/(2*fc)$$

where c=speed of light and
fc=frequency of the carrier signal

As shown in FIG. 4, the target distance Dt is in the second distance representative interval Dri(2) and represented as a solid x in quadrants IV and III. A representation of a target velocity Vtm' is shown in FIG. 4 as a dashed circle in quadrants I and IV of the first velocity representative interval Vri(1). The actual target velocity Vtm is in a second velocity representative interval Vri(2) and is shown as a solid circle in quadrants II and III of FIG.4. The external clutter features of altitude velocity Vam (actual) and Vam' (representation), altitude distance Da (actual) and Da' (representation), interference distance Di (actual) and Di' (representation) and interference velocity Vim (actual) and Vim' (representation) in FIG. 4 are shown as bands because of the resolution requirements necessary to prevent a target signal from being obscured.

Figure 5:
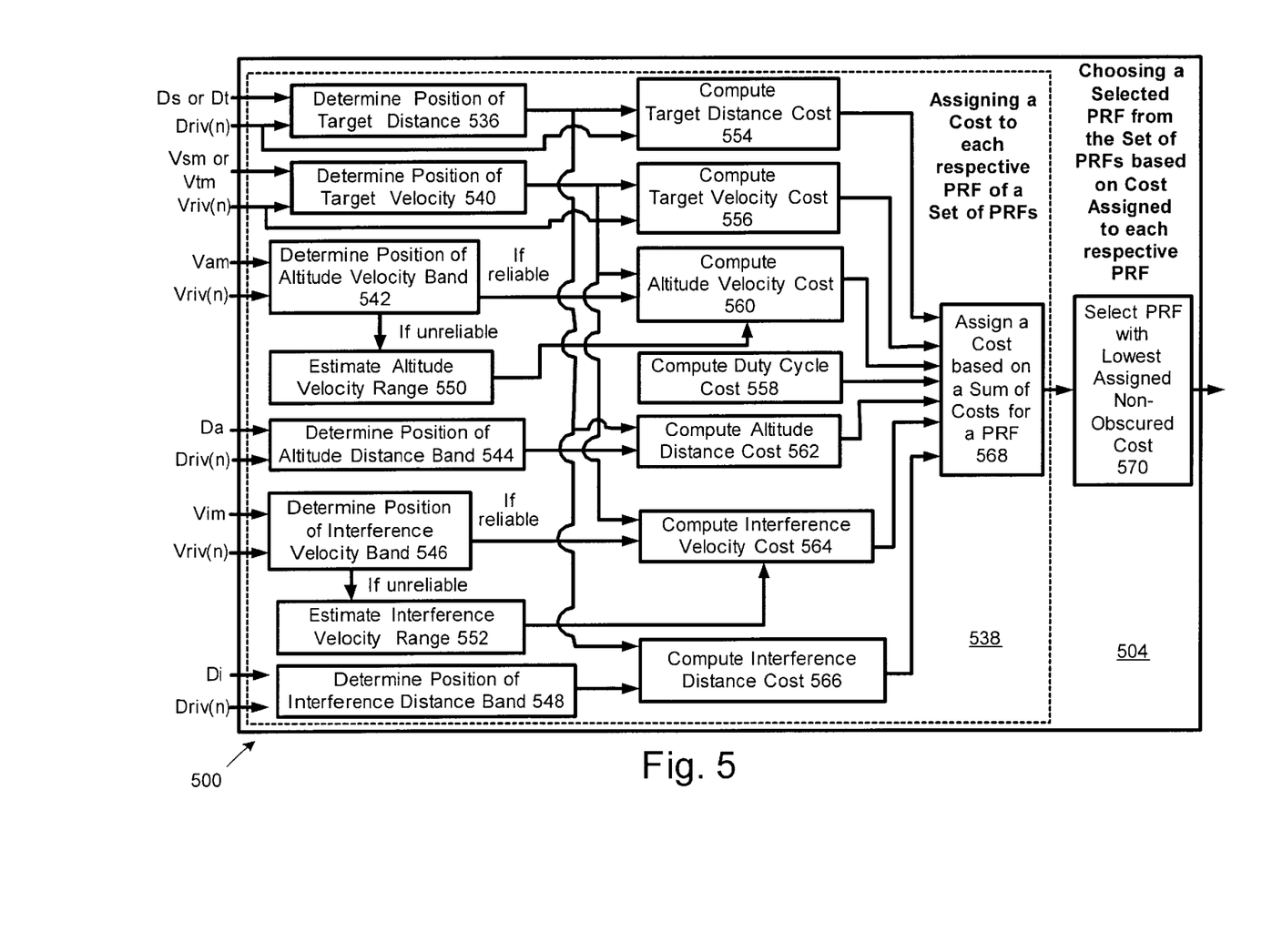
FIG. 5 is a block diagram of exemplary embodiments to choosing a selected PRF from a set of PRFs based on cost assigned to each PRF.

FIG. 5 is a block diagram of an exemplary embodiment 500 to choose a selected PRF from a set of PRFs based on cost assigned to each PRF 504. Assigning cost to each PRF within a set of PRFs can include determining the positions of a target distance 538 and target velocity 540 within the feature representative intervals of each pulse repetition frequency that these target features are within, respectively. Assigning cost to each PRF can include determining the positions of altitude velocity band 542, altitude distance band 544, interference velocity band 546 and interference distance band 548 within the feature representative intervals of each PRF that these external clutter features are within, respectively.

Figure 6:
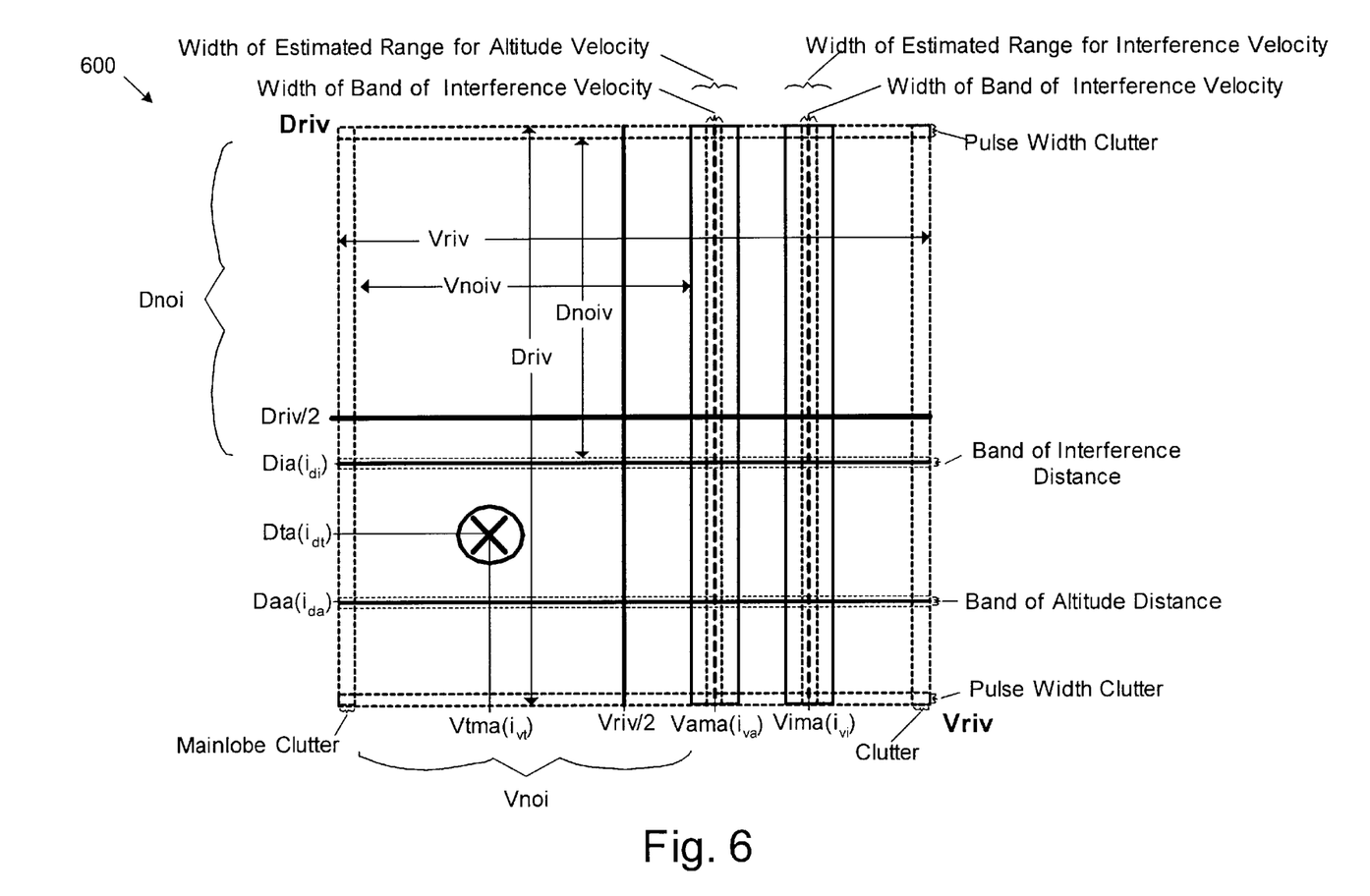
FIG. 6 is an exemplary graphical representation of feature representative intervals of an exemplary PRF and the positions of target features and external clutter feature band/ranges for the exemplary PRF.

Embodiments of the present invention with regard to determining positions of target and external features will further be described in reference to the previous example. The received target distance and velocity are represented by Dt and Vt, respectively. The received altitude distance and interference distance are represented by Da and Vi, respectively. A set of PRFs is represented by PRF(n) where n is from 1 to the number of respective PRFs in the set. As discussed previously, it is assumed that a motion compensation process has been applied to the received signal such that the mainlobe clutter is centered at zero Doppler frequency. The motion compensation process shifts the target, altitude and interference velocities to new velocities of Vtm, Vam and Vim, respectively. FIG. 6 is an exemplary graphical representation 600 of feature representative intervals of an exemplary PRF and the positions of target features and external clutter feature band/ranges for the exemplary PRF.

The position of target distance $Dta(i_{dt,\ n})$ within the distance representative intervals (i.e., $i_{dt}$ intervals) that contain a representation or the actual target distance is determined for each PRF in accordance with the following relationship:

$$Dta(i_{dt,\ n}) = \text{mod}(Dt, Driv_n)$$

where n is the number of the PRF within the set of PRFs and mod is a modulus function FIG. 6 shows the position of $Dta(i_{dt})$ within the distance representative interval $Dri(i_{dt})$ that the target distance is actually within for the exemplary PRF, as well as, in subsequent intervals. The position of target velocity Vtma $(i_{vt,\ n})$ within the velocity representative intervals (i.e., $i_{vt,\ n}$ intervals) that contain a representation or the actual target velocity is determined for each PRF in accordance with the following relationship:

$$Vtma(i_{vt,\ n}) = \text{mod}(Vtm, Vriv_n)$$

FIG. 6 also shows the position of $Vtma(i_{vt})$ within the distance representative interval $Vri(i_{vt})$ that the target velocity is within for the exemplary PRF.

The positions of the altitude velocity $Vama(i_{va})$ band and interference velocity $Vim(i_{va})$ band are determined for the velocity representative interval of each PRF that these external clutter velocities are within for each PRF in accordance with the following relationship:

$$Vama(i_{va,\ n}) = \text{mod}(Vam, VriV_n)$$

$$Vima(i_{vi,\ n}) = \text{mod}(Vim, Vriv_n)$$

In addition, the positions of the altitude distance $Daa(i_{da})$ and interference distance $Dia(i_{di})$ bands are determined for the distance representative intervals that these external clutter distances are actually within for each PRF, as well as in subsequent intervals, with the following relationship:

$$Daa(i_{da,\ n}) = \text{mod}(Da, DriV_n)$$

$$Dia(i_{di,\ n}) = \text{mod}(Di, DriV_n)$$

FIG. 6 shows the positions of $Vama(i_{va})$ and $Vima(i_{vi})$ for the velocity representative intervals ($i_{va}$ and $i_{vi}$) of the exemplary PRF that these clutter features are within along with their bands of resolution centered about their positions. In addition, FIG. 6 shows the positions of $Dia(i_{dt})$ and $Daa(i_{da})$ for the distance representative intervals ($i_{dt}$ and $i_{da}$) of the exemplary PRF that these external clutter features are within along with their bands of resolution centered about their positions.

As shown in the exemplary embodiments 500 of FIG. 5, assigning cost to each PRF of a set of PRFs can include estimating an altitude velocity range 550 when the altitude velocity is unreliable and/or an interference velocity range 552 when the interference velocity is unreliable. For example, the received altitude velocity for an airborne radar system may be inaccurate or inconsistent because of hilly or mountainous terrain. Therefore, a range of altitude velocities that includes and is centered about the altitude velocity band can be estimated to accommodate for inaccuracies or possible inconsistencies in the altitude velocity signal due to the hilly or mountainous terrain. An interference velocity may be inconsistent because the signal source causing the interference velocity may be moving or changing direction. Therefore, a range of interference velocities that includes and is centered about the interference velocity band can be estimated to accommodate for inconsistencies or possible inconsistencies in the interference velocity signal. FIG. 6 shows the positions of both altitude velocity $Vama(i_{va})$ and interference velocity $Vima(i_{vi})$ for a velocity representative interval of the exemplary PRF that these external clutter features are actually within along with their estimated ranges centered about their positions.

The exemplary embodiments 500 of FIG. 5 includes assigning cost to each PRF based on computing a target distance cost 554 and a target velocity cost 556. The target feature costs are computed so that a selected PRF is chosen having target features closest to the center of the selected PRF's feature representative interval.

FIG. 6 shows the centers of feature representative intervals as Driv/2 and Vriv/2 for the exemplary PRF. However, the feature representative intervals contain internal clutter, as shown in FIG. 6, near the ends of the feature representative intervals that may obscure target features. The computation of target feature costs can also take into account the internal clutter features of the feature representative intervals of each PRF. For example, a target feature cost function can compute a non-obscured result based upon a distance between the position of the target feature and a center of a feature representative interval when the position of the target feature is within the non-obscured region between internal clutters of a feature representative interval of each PRF or computes an obscured cost when the position of the target feature is outside of the non-obscured region between internal clutters of a feature representative interval of each PRF. Thus, a cost function can compute a target feature cost based on a non-obscured region between internal clutters of a feature representative interval as the feature assessment interval of each PRF.

Embodiments of the present invention with regard to computing target feature costs will be further described by further reference to the previous example of an exemplary PRF. As shown in the exemplary embodiment 500 of FIG. 5, a target distance cost Cdt of each PRF within a set of PRFs 538 (that is, any two or more PRFs in a set or in any subset of the set) can be computed according to a first cost function as follows:

$$Cdt(n) = abs(Dta(i_{dt,\ n}) - Driv_n/2)/Driv_n \text{ when}$$

$$(PWC(n)/2) < Dta(i_{dt,\ n}) < (Driv_n - PWC(n)/2)$$

$$PWC(n) = c*\tau(n)/2$$

where $\tau$=transmitted pulse width for PRF(n)

else $$Cdt(n) = (abs(Dta(i_{dt,\ n}) - Driv_n/2)/Driv_n) \times \delta$$

where $\delta$ is an empirically derived constant greater than 1. A larger non-obscured target distance cost Cdt can be computed for a respective PRF as the position of the target distance gets farther from the center of the distance representative interval Dri of the respective PRF. For example, the target distance cost will be zero when the target distance is at the center of the distance representative interval. A target velocity cost Cvt of each PRF within a set of PRFs can be computed according to a second cost function, which can be used in addition to or as the first cost function, as follows:

$$Cvt(n) = abs(Vtma(i_{vt,\ n}) - Vriv_n/2)Vriv_n \text{ when}$$

$$MC(n)/2 < Vtma(i_{vt,\ n}) < Vriv_n - MC(n)/2$$

where MC(n)=width of mainlobe clutter for the PRF(n)
else $$Cvt(n)=(abs(Vtma(i_{vt,\,n})-Vriv_n/2)/Vriv_n)\times\delta$$

where δ is an empirically derived constant of greater than 1.

A larger non-obscured target velocity cost Cvt can be computed for a respective PRF as the position of target velocity gets farther from the center of the velocity representative interval Vri of the respective PRF. For example, the cost Cvt will be zero at the center of the velocity representative interval.

As shown in the exemplary embodiment 500 of FIG. 5, assigning cost to each PRF of a set of PRFs 538 can include computing a duty cycle cost 558 of each PRF within the set of pulse repetition frequencies. For example, the duty cycle cost Cdc is larger for a PRF with a smaller duty cycle compared to another PRF with a larger duty cycle.

$$Cdc(n)=1/DC(n)$$

where DC=duty cycle of the PRF(n)

Thus, a PRF delivering energy for a longer period to the target or in search of the target can be assigned a lower cost than another PRF delivering energy for a shorter period.

As shown in the exemplary embodiment 500 of FIG. 5, assigning cost to each PRF of a set of PRFs 538 based on external clutter feature costs by computing an altitude velocity cost 560, an altitude distance cost 562, an interference velocity cost 564 and an interference distance cost 566. These external clutter feature costs can be computed so that a selected PRF is chosen in which the target features are not obscured by external clutter features. An external clutter feature cost function can compute an external clutter feature cost based on the external clutter feature bands or external clutter feature ranges as being the feature assessment intervals to determine whether a target feature will be obscured by an external clutter feature. An external clutter feature cost function can compute an obscured cost based upon a distance between the position of the target feature and a center of the feature assessment interval when the position of the target feature is within the feature assessment interval or computes a zero non-obscured cost when the position of the target feature is outside of the feature assessment interval.

For example, a cost function can compute an obscured cost based upon a distance between the position of the target feature and a center of an external clutter feature band when the position of the target feature is within the external clutter feature band or compute a zero non-obscured cost when the position of the target feature is outside of the external clutter feature band. However, when the external clutter feature is unreliable, a cost function can compute an obscured cost based upon a distance between the position of the target feature and a center of an external clutter feature range when the position of the target feature is within the external clutter feature range or compute a zero non-obscured cost when the position of the target feature is outside of the external clutter feature range.

Embodiments of the present invention with regard to computing external clutter feature costs are described by further reference to the previous example. An altitude velocity cost Cva of each PRF within a set of PRFs can be computed according to a cost function as follows:

$$Cva(n)=|(AVB/(Vtma(i_{vt,\,n})-Vama(i_{va,\,n}))|\times\delta \text{ when}$$

$$(Vama(i_{va,\,n})-AVB/2)<Vtma(i_{vt,\,n})<(Vama(i_{va,\,n})+AVB/2)$$

where AVB=width of the altitude velocity band and where δ is an empirically derived constant.
else $$Cva(n)=0$$

When the altitude velocity is unreliable, altitude velocity cost Cva can be computed for each PRF according to a cost function as follows:

$$Cva(n)=|(AVR/(Vtma(i_{vt,\,n})-Vama(i_{va,\,n}))|\times\delta \text{ when}$$

$$(Vama(i_{va,\,n})-AVR/2)<Vtma(i_{vt,\,n})<(Vama(i_{va,\,n})+AVR/2)$$

where AVR=width of the altitude velocity resolution range and where δ is an empirically derived constant.
else $$Cva(n)=0$$

The altitude velocity cost for a PRF can be a zero non-obscured cost if the position of the target velocity does not fall within the altitude velocity band or range. Otherwise, the altitude velocity cost Cva of a respective PRF is an obscured cost, which is inversely proportional to the distance of the position of the target velocity from the center of the altitude velocity band/range for the respective PRF.

An interference velocity cost Cvi of each PRF within a set of PRFs can be computed according to a cost function as follows:

$$Cvi(n)=(IVB/(Vtma(i_{vt,\,n})-Vima(i_{vi,\,n}))|\times\delta \text{ when}$$

$$(Vima(i_{vi,\,n})-IVB/2)<Vtma(i_{vt,\,n})<(Vima(i_{vi,\,n})+IVB/2)$$

where IVB=width of the interference velocity band and where δ is an empirically derived constant.
else $$Cvi(n)=0$$

When the interference velocity is unreliable, interference velocity cost Cvi of each PRF for a set of PRFs can be computed according to a cost function as follows:

$$Cvi(n)=|(IVR/(Vtma(i_{vt,\,n})-Vima(i_{vi,\,n}))|\times\delta \text{ when}$$

$$(Vima(i_{vi,\,n})-IVR/2)<Vtma(i_{vt,\,n})<(Vima(i_{v,\,n})+IVR/2)$$

where IVR=width of the interference velocity range and where δ is an empirically derived constant.
else $$Cvi(n)=0$$

The interference velocity cost Cvi for a PRF can be a zero non-obscured cost if the position of the target velocity does not fall within the interference velocity band or range. Otherwise, the interference velocity cost Cvi of the respective PRF is an obscured cost, which is inversely proportional to the distance of the position of the interference velocity from the center of the interference velocity band/range for the respective PRF.

An interference distance cost Cdi of each PRF for a set of PRFs can be computed according to a cost function as follows:

$$Cdi(n)=|(IDB/(Dta(i_{dt,\,n})-Dia(i_{di,\,n}))|\times\delta \text{ when}$$

$$(Dia(i_{di,\,n})-IDB/2)<Dta(i_{dt,\,n})<(Dia(i_{di,\,n})+IDB/2)$$

where IDB=width of the interference distance band and
where δ is an empirically derived constant.
else $$Cdi(n)=0$$

The interference distance cost for a PRF can be a zero non-obscured cost if the target distance does not fall within the interference distance band of the respective PRF. Otherwise, the interference distance cost of the PRF can be an obscured cost, which is inversely proportional to the distance from the center of the interference distance band. An altitude distance cost Cda of each PRF for a set of PRFs can be computed according to a cost function as follows:

$$Cda(n)=|(ADB/(Dta(i_{dt,\,n})-Daa(i_{da,\,n})))|\times\delta \text{ when}$$

$$(Daa(i_{da,\,n})-ADB/2)<Dta(i_{dt,\,n})<(Daa(i_{da,\,n})+ADB/2)$$

where ADB=width of the altitude distance band and
where δ is an empirically derived constant.
else $$Cda(n)=0$$

The altitude distance cost of a PRF can be a zero non-obscured cost if the position of the target distance does not fall within the altitude distance band of the respective PRF. Otherwise, the altitude distance cost is an obscured cost, which is inversely proportional to the distance of the position of the target distance from the center of the altitude distance band for the respective PRF.

As shown in the exemplary embodiment 500 of FIG. 5, the cost Ct(n) assigned to each PRF of a set of PRFs can be based on a sum of costs for a PRF 568. For example, the total cost Ct(n) can be the sum of the costs from as shown in the following relationship:

$$Ct(n)=Cdt(n)+Cvt(n)+Cva(n)+Cvi(n)+Cdi(n)+Cda(n)+Cdc(n)$$

The PRF assigned the lowest non-obscured cost Ct(n) 570 is selected as the PRF for the next emission of a PRF to search for, track or detect a target. If all of the PRFs are obscured, the PRF having the lowest assigned obscured total cost Cδ t(n) is chosen as the selected PRF.

In the alternative, the total cost can be the sum of costs in which at least one of the target feature costs and the external clutter feature costs are multiplied by a factor for the respective feature such that the cost is a weighted cost. For example, the total weighted cost Ck(n) assigned to each PRF of a set of PRFs can be the sum of weighted costs in which each of the results of the cost functions for the target features and external clutter features are multiplied by a factor for the respective feature, as shown in the following computation:

$$Ck(n)=(Kdt\times Cdt(n))+(Kvt\times Cvt(n))+(Kva\times Cva(n))+(Kvi\times Cvi(n))+\\(Kdi\times Cdi(n))+(Kda\times Cda(n))+(Kdc\times Cdc(n))$$

where Kdt, Kvt, Kva, Kvi, Kdi, Kda and Kdc are empirically chosen factors which can be adapted to optimize performance for a given radar design or operating environment. For example, larger factors can be chosen for the target distance factor Kdt and the target velocity factor Kvt such that target distance and target velocity costs are more heavily weighted in the overall weighted cost Ck for a PRF. The PRF(n) having the lowest assigned non-obscured total weighted cost Ck(n) 570 is selected as the next PRF for emission to search for, track or detect a target. If all of the PRFs are obscured, the PRF having the lowest assigned obscured total weighted cost Cδ k(n) is chosen as the selected PRF.

The method of choosing a selected PRF from a set of PRFs based on cost assigned to each PRF can include assigning cost to each PRF of a set of PRFs so that a selected PRF is chosen that places a target feature closest to the center of a feature non-obscured interval having the widest width between clutter features within the feature representative interval of the selected PRF. Thus, cost for a PRF would be based on a feature non-obscured interval having the widest width between clutter features of a feature representative interval of the PRF as being the feature assessment interval of the PRF. A cost function would compute a "not-within-selected-interval" cost when the target position is outside the feature assessment interval or compute a non-obscured cost based upon a distance between the target position and a center of the feature assessment interval when the target position is within the feature assessment interval for each PRF.

For example, the widest feature non-obscured interval between clutter features, either external or internal, of the feature representative interval of each PRF can be selected as the feature assessment interval of each PRF. In the previously referred to exemplary PRF, as shown in FIG. 6, a velocity non-obscured interval Vnoi and a distance non-obscured interval Dnoi would be the widest feature non-obscured intervals between clutter features of the feature representative intervals for the exemplary PRF. The respective values of the velocity non-obscured interval Vnoi and the distance non-obscured interval Dnoi would be Vnoiv and Dnoiv, as shown in FIG. 6. The velocity non-obscured interval value Vnoiv and distance non-obscured interval value are calculated based on the positions and widths of the clutters within a feature representative interval of a PRF.

Figure 7:
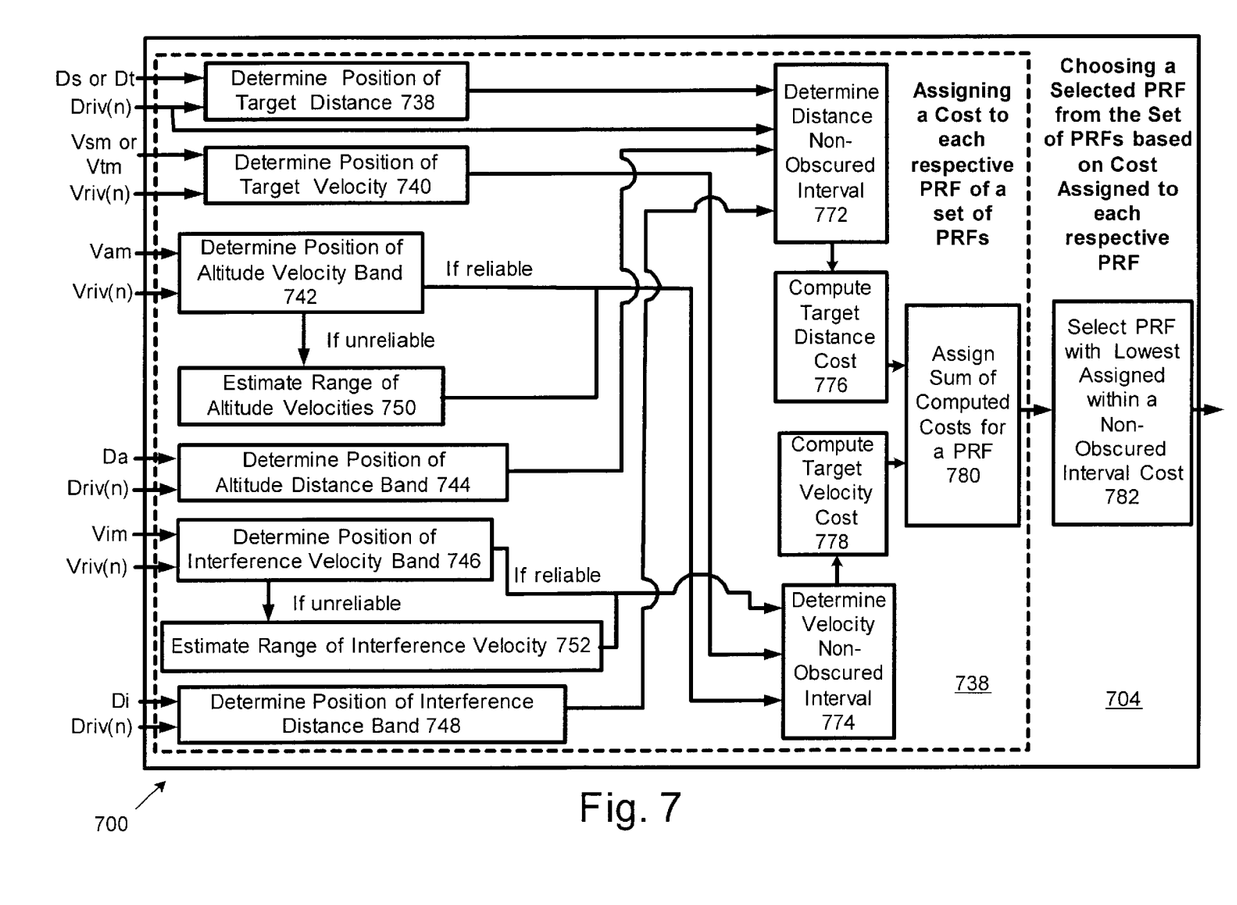
FIG. 7 is another block diagram of exemplary embodiments to choosing a selected PRF from a set of PRFs based on cost assigned to each PRF.

FIG. 7 is a block diagram of an exemplary embodiment 700 to choose a selected PRF from a set of PRFs based on cost assigned to each PRF 704. Assigning cost to each PRF of a set of PRFs 738 can include determining the positions of a target distance 738 and target velocity 740 within the feature representative intervals of each PRF that these target features are within, respectively. In addition, assigning cost to each PRF 738 can include determining the positions of altitude velocity band 742, altitude distance band 744, interference velocity band 746 and interference distance band 748 within the feature representative intervals of each PRF that these external clutter features are within, respectively. Assigning cost to each PRF of a set of PRFs 738 can also include estimating an altitude velocity range 750 when the altitude velocity is unreliable and/or an interference velocity range 752 when the interference velocity is unreliable.

As shown in the exemplary embodiment 700 of FIG. 7, assigning cost to each PRF of a set of PRFs 738 can include determining a distance non-obscured interval 772 based on the position of the target distance with respect to the internal clutter and external clutter distance bands/ranges, if any, for each PRF. In addition, as shown in FIG. 7, assigning cost to each PRF of a set of PRFs 738 can include determining a velocity non-obscured interval 774 based on the positions of the target velocity with respect to the internal clutter and external clutter velocity bands/ranges, if any, for each PRF. After the feature non-obscured intervals are determined, as shown in FIG. 7, a target distance cost 776 and a target velocity cost 778 are computed. The computation of target costs in the exemplary embodiment 700 of FIG. 7 will be described in reference to the previous example of the exemplary PRF.

A target distance cost of a distance non-obscured interval between clutter features of the distance representative interval for the exemplary PRF can be computed according to a cost function as follows:

$$Cdt_{noi}(n)=abs(Dta(i_{dt,\ n})-Dnoriv_n/2)/Dnoriv_n \text{ when}$$

$$((Dia(i_{dt,\ n})+IDB(n)/2)<Dta(i_{dt,\ n})<((Driv_n)-PWC)$$

where IDB(n)=width of the interference distance band for PRF(n)
else $$Cdt_{noi}(n)=abs(Dta(i_{dt,\ n})-DnoriV_n/2)/DnoriV_n \times \delta$$

where δ is a constant greater than 1.

Thus, a larger non-obscured target distance cost $Cdt_{noi}$ can be computed for a PRF as the position of the target distance gets farther from the center of the widest distance non-obscured interval Dnoriv. A target velocity cost for the exemplary PRF of the widest velocity non-obscured interval can be computed according to a cost function as follows:

$$Cvt_{noi}(n)=abs(Vtma(i_{vt,\ n})-Vnoriv_n/2)Vnoriv_n \text{ when}$$

$$MC(n)<Vtma(i_{vt,\ n})<((Vama(i_{va,\ n})-IVR(n)/2)$$

where MC(n)=width of mainlobe clutter for the PRF(n)
IVR(n)=width of interference velocity range for PRF(n)
else $$Cvt_{noi}(n)=(abs(Vtma(i_{vt,\ n})-Vnoriv_n/2)/Vnoriv_n)\times \delta$$

where δ is a constant greater than 1.

Thus, a larger non-obscured target velocity cost $Cvt_{noi}$ can be assigned to a PRF as the target velocity gets farther from the center of the widest velocity non-obscured interval Vnoriv.

As shown in the exemplary embodiment 700 of FIG. 7, the cost $Ct_{noi}(n)$ assigned to each PRF of a set of PRFs can be the sum of non-obscured target velocity and distance costs for each PRF 780. For example, the cost $Ct_{noi}(n)$ can be computed as follows:

$$Ct_{noi}(n)=Cdt_{noi}(n)+Cvt_{noi}(n)$$

The PRF with the lowest assigned non-obscured interval cost $Ct_{noi}(n)$ 782 is selected as the PRF for the next emission of a PRF to search for, track or detect a target. If all of the costs are obscured costs, then another type of cost assignment can be used having a different type of feature assessment interval or the PRF having the least obscured cost can be used.

The method of selection in the previously disclosed embodiments can use other types of cost functions. For example, the normalized distance from the center of the feature assessment interval can be replaced with a non-normalized distance from the center or some other metric assigned to each PRF. In addition, PRFs costs can be assigned based on whether the PRF is a low, medium or high frequency PRF.

It will be apparent to those skilled in the art that various changes and modifications can be made in the cost functions of the present invention without departing from the spirit and scope thereof. Thus, it is intended that the present invention cover the modifications of this invention provided they come within the scope of the appended claims and their equivalents.

What is claimed is:

1. A method for selecting a pulse repetition frequency to detect, track or search for a target comprising:
   identifying a first feature representative interval of each pulse repetition frequency within a set of pulse repetition frequencies;
   choosing a selected pulse repetition frequency from the set of pulse repetition frequencies based on cost assigned to each pulse repetition frequency, wherein the cost assigned to a first pulse repetition frequency is at least based on a first cost function of a first position of a first target feature in relation to a first feature assessment interval of the first pulse repetition frequency; and
   emitting pulsed energy from the emitter using the selected pulse repetition frequency.

2. A radar system using the method for selecting a pulse repetition frequency of claim 1, comprising:
   a pulse repetition frequency selector;
   a radar transmitter; and
   an emitter.

3. The method for selecting a pulse repetition frequency of claim 1, wherein the step of identifying includes determining a first feature representative interval value of each pulse repetition frequency from a first feature representative interval of each pulse repetition frequency.

4. The method for selecting a pulse repetition frequency of claim 3, wherein the step of identifying includes determining a second feature representative interval value of each pulse repetition frequency from a second feature representative interval of each pulse repetition frequency.

5. The method for selecting a pulse repetition frequency of claim 3, wherein the step of choosing includes determining the first position of the first target feature within the first feature representative interval of the first pulse repetition frequency.

6. The method for selecting a pulse repetition frequency of claim 5, wherein the step of choosing includes determining a second position of a first external clutter feature band within the first feature representative interval of the first pulse repetition frequency.

7. The method for selecting a pulse repetition frequency of claim 6, wherein the step of choosing includes estimating a first external clutter feature range of the first pulse repetition frequency that includes and is centered about the first external clutter feature band when a first external clutter feature is unreliable.

8. The method for selecting a pulse repetition frequency of claim 5, wherein the first cost function computes at least one of a first non-obscured cost based upon a distance between the first position and a center of the first feature representative interval when the first position is within a first feature assessment interval of the first pulse repetition frequency, and an obscured cost based upon a distance between the first position and a center of the first feature representative interval when the first position is outside of the first feature assessment interval of the first pulse repetition frequency.

9. The method for selecting a pulse repetition frequency of claim 8, wherein the first feature assessment interval is a non-obscured region between internal clutters of the first feature representative interval of the first pulse repetition frequency.

10. The method for selecting a pulse repetition frequency of claim 1, wherein the step of choosing includes a cost function based on a duty cycle of the first pulse repetition frequency.

11. The method for selecting a pulse repetition frequency of claim 6, wherein the first cost function computes at least one of a zero non-obscured cost when the first position is outside of a first feature assessment interval, and an obscured cost based upon a distance between the first position and a center of the first feature assessment interval when the first position is within a first feature assessment interval.

12. The method for selecting a pulse repetition frequency of claim 11, wherein the first feature assessment interval is a first external clutter feature band.

13. The method for selecting a pulse repetition frequency of claim 11, wherein cost from the first cost function is multiplied by a first feature factor.

14. The method for selecting a pulse repetition frequency of claim 7, wherein the first cost function computes at least one of a zero non-obscured cost when the first position is outside the first feature assessment interval of the first pulse repetition frequency, and an obscured cost based upon a distance between the first position and a center of the first feature assessment interval when the first position is within the first feature assessment interval of the first pulse repetition frequency.

15. The method for selecting a pulse repetition frequency of claim 14, wherein the first feature assessment interval is a first external clutter feature range.

16. The method for selecting a pulse repetition frequency of claim 14, wherein cost from the first cost function is multiplied by a first feature factor.

17. The method for selecting a pulse repetition frequency of claim 5, wherein the first cost function computes at least one of a not-within-selected-interval cost when the first position is outside a first feature assessment interval of the first pulse repetition frequency, and a non-obscured cost based upon a distance between the first position and a center of the first feature assessment interval when the first position is within the first feature assessment interval of the first pulse repetition frequency.

18. The method for selecting a pulse repetition frequency of claim 17, wherein the first feature assessment interval is a first feature non-obscured interval having a widest width between clutter features of the feature representative interval.

19. A method for selecting a pulse repetition frequency to detect, track or search for a target comprising:
    identifying distance and velocity representative intervals of each respective pulse repetition frequency within a set of pulse repetition frequencies;
    choosing a selected pulse repetition frequency from the set of pulse repetition frequencies based on cost assigned to each pulse repetition frequency, wherein the cost assigned to a first pulse repetition frequency is at least based on a first cost function of a first position of a target distance in relation to a distance assessment interval of the first pulse repetition frequency and a second cost function of a second position of a target velocity in relation to a velocity assessment interval of the first pulse repetition frequency; and
    emitting pulsed energy from the emitter using the selected pulse repetition frequency.

20. The method for selecting a pulse repetition frequency of claim 19, wherein the distance assessment interval is a widest distance non-obscured interval of the distance representative interval of the first pulse repetition frequency; and
    the velocity assessment interval is a widest velocity non-obscured interval of the velocity representative interval of the first pulse repetition frequency.

* * * * *